(12) United States Patent
Anders et al.

(10) Patent No.: US 11,071,609 B2
(45) Date of Patent: Jul. 27, 2021

(54) SCANNING OBJECT CARRIER

(71) Applicant: Amann Girrbach AG, Koblach (AT)

(72) Inventors: Johannes Anders, Feldkirch (AT); Marcel Humml, Altach (AT); Jurgen Amann, Koblach (AT)

(73) Assignee: Amann Girrbach AG, Koblach (AT)

( * ) Notice: Subject to any disclaimer, the term of this patent is extended or adjusted under 35 U.S.C. 154(b) by 96 days.

(21) Appl. No.: 16/488,645

(22) PCT Filed: Feb. 20, 2018

(86) PCT No.: PCT/AT2018/000006
§ 371 (c)(1),
(2) Date: Aug. 26, 2019

(87) PCT Pub. No.: WO2018/157182
PCT Pub. Date: Sep. 7, 2018

(65) Prior Publication Data
US 2021/0137651 A1 May 13, 2021

(30) Foreign Application Priority Data
Feb. 28, 2017 (AT) ................................ GM 45/2017

(51) Int. Cl.
*A61C 9/00* (2006.01)
*A61C 19/04* (2006.01)
*G01B 11/25* (2006.01)

(52) U.S. Cl.
CPC ............ *A61C 9/0053* (2013.01); *A61C 19/04* (2013.01); *G01B 11/2518* (2013.01)

(58) Field of Classification Search
CPC .... A61C 9/0053; A61C 19/04; G01B 11/2518
See application file for complete search history.

(56) References Cited

U.S. PATENT DOCUMENTS

| 4,885,761 A | 12/1989 | Sones et al. |
| 2002/0094504 A1 | 7/2002 | Hintersehr |
| 2006/0177794 A1 | 8/2006 | Yau et al. |
| 2008/0095323 A1* | 4/2008 | Stayman ................ A61B 6/032 378/198 |

(Continued)

FOREIGN PATENT DOCUMENTS

| CN | 103731586 | 4/2014 |
| CN | 204559704 | 8/2015 |
| CN | 205157409 | 4/2016 |

(Continued)

*Primary Examiner* — Jamil Ahmed
(74) *Attorney, Agent, or Firm* — Volpe Koenig

(57) ABSTRACT

A scanning object carrier (1), which is provided for installation on a scanner rocker (2) of a scanning device (3) for scanning at least one, in particular dental, object (20), wherein the scanning object carrier (1) includes a base body (4) and at least one fastening device (5) for fastening the base body (4) to the scanner rocker (2) and at least one object fixing device (6) for fixing the object (20) to the scanning object carrier (1), wherein the object fixing device (6) is mounted in a pivotable manner on the base body (4) relative to the base body (4), and wherein the object fixing device (6) is mounted in a pivotable manner on the base body (4) between two end positions (7, 8) by freely following gravity.

11 Claims, 4 Drawing Sheets

(56) References Cited

U.S. PATENT DOCUMENTS

2014/0353451 A1   12/2014   Hein et al.
2016/0008111 A1   1/2016    Jumpertz

FOREIGN PATENT DOCUMENTS

| CN | 205494032    | 8/2016  |
|----|--------------|---------|
| CN | 205580383    | 9/2016  |
| DE | 10102115     | 8/2002  |
| DE | 202009011060 | 3/2010  |
| DE | 102013203312 | 8/2014  |
| DE | 102013005999 | 10/2014 |
| EP | 1975547      | 10/2008 |
| KR | 101291713    | 2/2013  |
| KR | 20130013583  | 2/2013  |
| KR | 101669818    | 10/2016 |
| WO | 2008014461   | 1/2008  |

* cited by examiner

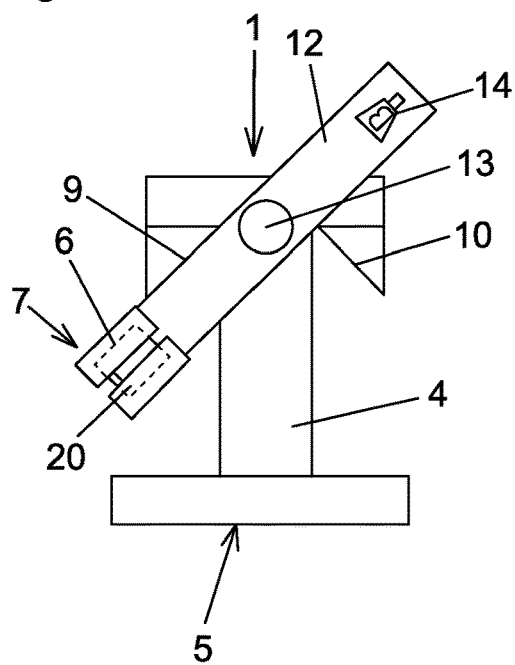
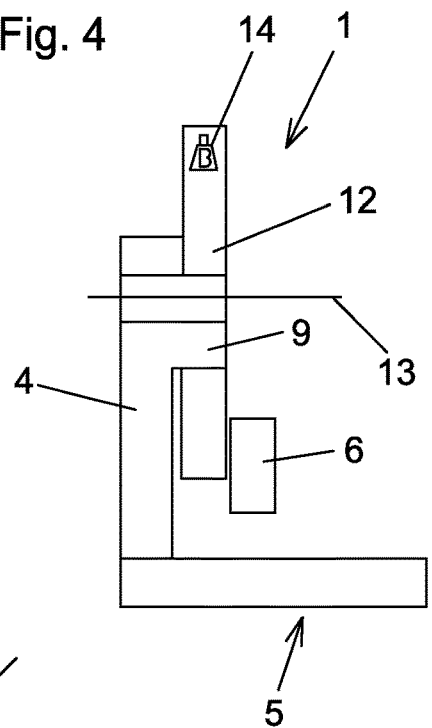
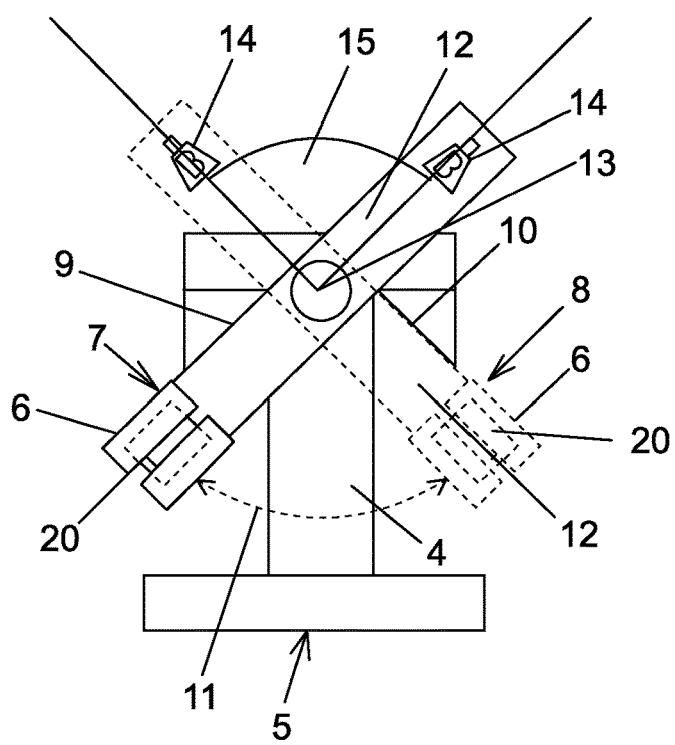

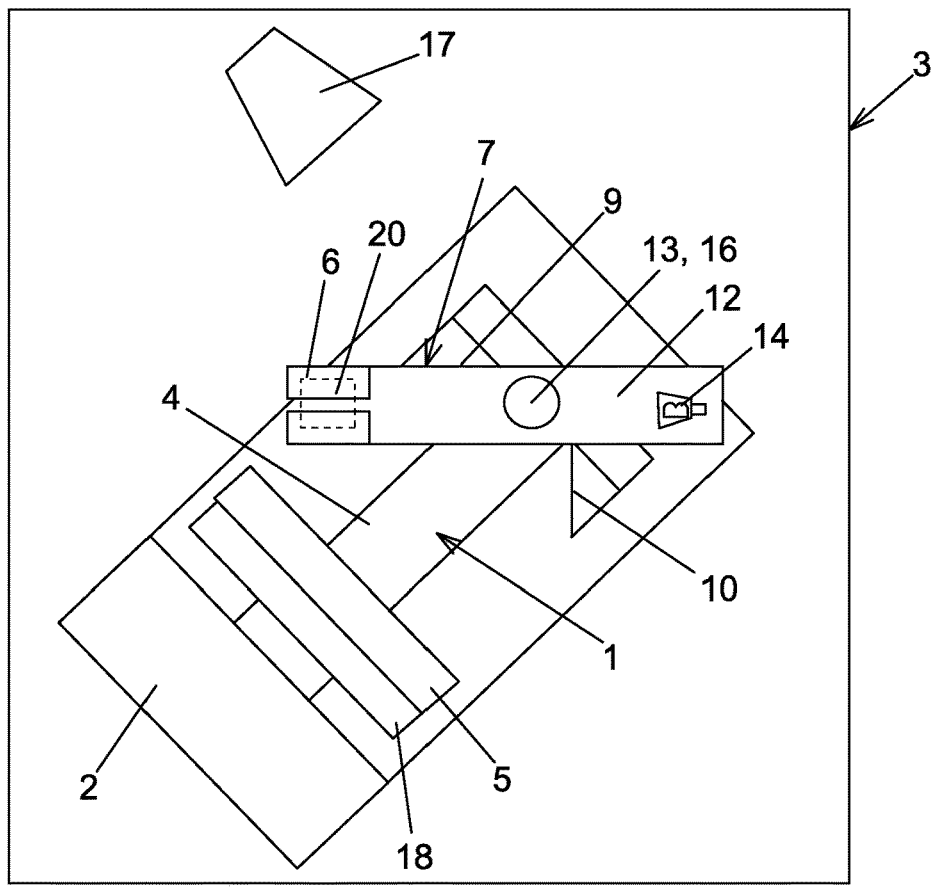
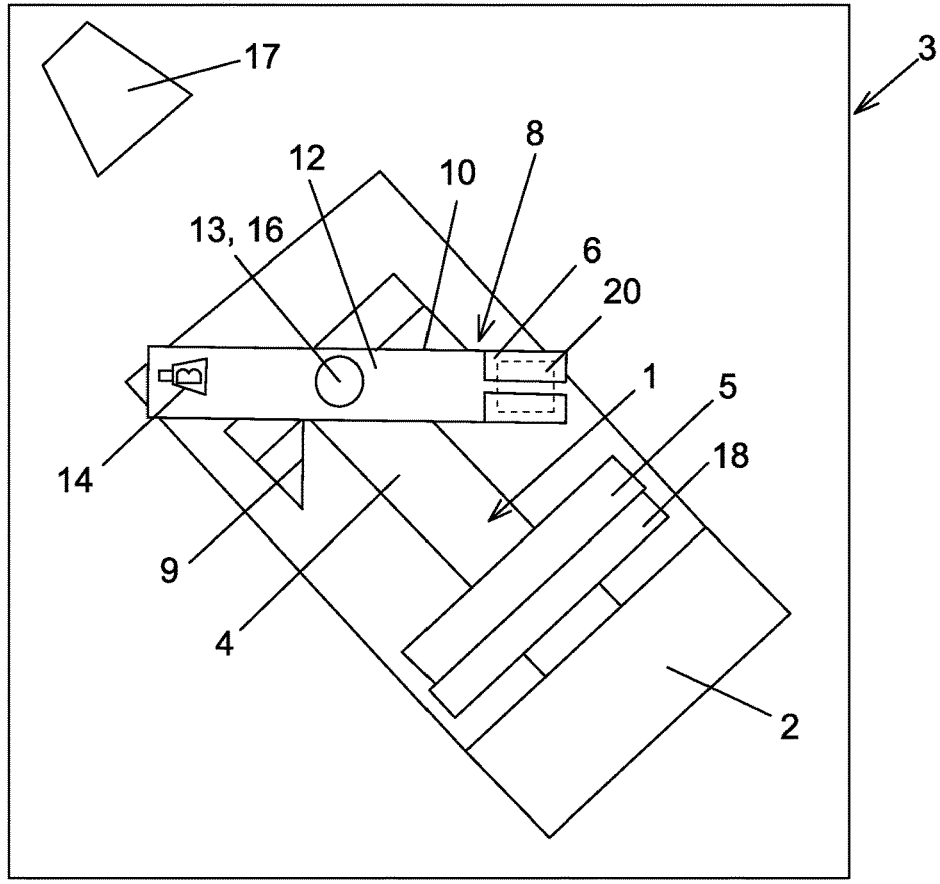

SCANNING OBJECT CARRIER

TECHNICAL FIELD

The present invention relates to a scanning object carrier provided for assembly on a scanner rocker of a scanning device for scanning at least one, in particular, dental, object, wherein the scanning object carrier has a base body and at least one fastening device for fastening the base body on the scanner rocker and at least one object fixing device for fixing the object on the scanning object carrier, wherein the object fixing device is supported on the base body so that it can pivot relative to the base body. The invention also relates to an arrangement with a scanning device for scanning at least one, in particular, dental, object, and with a scanning object carrier. The invention further also relates to a method for scanning at least one, in particular, dental, object.

BACKGROUND

In particular, in the dental industry there is often the task of having to scan objects, such as dental impressions, i.e., negative molds, or jaw and/or tooth models from two different, in particular, mutually opposing sides. To be able to realize this without inserting and removing the object to be scanned between the scanning processes, scanning object carriers according to the class are known. In this context, for example, reference is made to the prior art published with KR 1020130013583 A. The technology disclosed in that publication provides a drive mechanism integrated in the scanning object carrier with a gearing mechanism and a corresponding actuator, with which the object fixing device is supported on the base body so that it can pivot relative to the base body. To be able to operate this drive mechanism, appropriate means for transmitting control commands and means for supplying power to the drive mechanism of the scanning object carrier must be provided in the scanner rocker and also in the scanning object carrier. This has the consequence that only scanning object carriers provided with correspondingly matching connections can be used in a scanning device.

SUMMARY

The object of the invention is to simplify a scanning object carrier according to the class to the extent that it can be used universally as much as possible in as many different scanning devices as possible and can have a relatively simple design.

To meet this objective, for a scanning object carrier of the type specified above, the invention provides that the object fixing device is supported on the base body so that it can pivot between two end positions freely following the force of gravity.

Thus, a basic idea of the invention is to completely eliminate the drive mechanisms known in the prior art in the scanning object carrier. For scanning object carriers according to the invention, the object fixing device is supported so that it can pivot freely between the two end positions such that it can be pivoted into the necessary end position following the force of gravity through a corresponding movement of the scanning object carrier in the scanning device. In this way, the scanning object carrier itself no longer needs any drive mechanism, so that there is no need for transmitting control commands to the scanning object carrier and also no need for supplying power to the scanning object carrier. In this way, it is achieved that the scanning object carrier according to the invention can be mounted in a wide array of different scanning devices on the scanner rocker provided there.

For an arrangement according to the invention with a scanning device for scanning at least one, in particular, dental, object and with a scanning object carrier that is mounted on a scanner rocker of the scanning device, the scanning object carrier is then constructed according to the invention. It is preferable in such arrangements when the scanner rocker can pivot about a rocker pivot axis of the scanning device and the object fixing device is held on the base body of the scanning object carrier so that it can pivot about an object carrier pivot axis, wherein the rocker pivot axis and the object carrier pivot axis are aligned or at least can be aligned coaxial to each other.

A method according to the invention for scanning at least one, in particular, dental, object, provides that the object is fixed on an object fixing device of a scanning object carrier according to the invention and the base body of the scanning object carrier is fixed with its fastening device on a scanner rocker of a scanning device and then a first side of the object is scanned in a first scanning process, wherein the object fixing device is located in a first of its end positions during the first scanning process and then the object fixing device is pivoted into the second of its end positions with the object fixed therein only through the pivoting of the scanner rocker and through the effect of the force of gravity and then a second side of the object is scanned in a second scanning process, wherein the object fixing device is located in the second of its end positions during the second scanning process. In this way, it does not matter whether first the scanning object carrier is fixed on the scanner rocker or whether first the object to be scanned is fixed on the object fixing device. The first end position for the first scanning process can also be set by corresponding pivoting of the scanner rocker after the assembly.

For such methods it is preferably provided that the first scanning process and the second scanning process are performed with the same scanner head of the scanning device. The scanner head of the scanning device is here a detector that performs the actual scanning process, that is, the measurement or imaging process. The scanning could also be called measuring or imaging or sampling. In the prior art there is a wide array of different scanning devices that can be used to record or measure the contours of an object. In preferred embodiments, the scanner head is arranged stationary in the scanning device.

To be able to image the object to be scanned from mutually opposing sides, preferred variants of the method according to the invention provide that the first side of the object and the second side of the object are mutually opposing sides of the object.

The term of fixing is here understood so that in the fixed state or, in other words, connected state, there is a fixed, preferably rigid, connection between the two components fixed to each other. This, however, naturally does not exclude that it can be a detachable connection that can be detached under the use of a tool or only by hand or in some other way and, if necessary, can also be connected to each other again.

The fastening device of the scanning object carrier or its base body is used to fasten the scanning object carrier on the scanner rocker for the scanning process. The fastening device can have very different constructions. It could be, e.g., a clamping device, a threaded connection, a friction-locking and/or positive-locking connection or the like. Here, the fastening device can have a shape and construction that allows the scanning object carrier or its base body to be fastened to almost any scanner rocker. However, it could also be just as easily provided that the fastening device and the scanner rocker have a kind of indexing that ensures that the base body can be fastened with the fastening device in a single, previously defined position on the scanner rocker.

The object fixing device can also have very different constructions for fixing the object to be scanned on the scanning object carrier. Here, the fixing device can also be, e.g., a clamping connection, a threaded connection, or some other kind of positive-locking or friction-locking connection. Here, a corresponding construction can also be selected so that the object to be scanned can be fixed uniquely in only one, namely the provided position on the object fixing device and thus on the scanning object carrier for the scanning process. On the other hand, naturally other constructions are also conceivable for the object fixing device, which are constructed so that they are as flexible as possible for fixing a wide array of objects to be scanned on the scanning object carrier.

The objects to be scanned are preferably dental objects, for example, the dental impressions mentioned above, that is, negative molds, or jaw and/or tooth models, that is, positive molds. Naturally, however, the invention can also be used for scanning other, non-dental objects. In one especially preferred way, the invention is used when the object must be scanned from two different, in particular, mutually opposing sides.

To define and specify the end positions between which the object fixing device is supported on the base body so that it can pivot freely following the force of gravity, preferred variants of the invention provide that the base body has two end stops for limiting the pivoting motion of the object fixing device in the end positions. Preferably, one end stop is provided for each end position.

The term of pivoting or the ability to pivot is to be interpreted broadly. It could also be referred to as tilting or tipping. Generally, during the pivoting motion, the object fixing device follows an overall curved path that, however, could also have straight sections. In one especially preferred way, it is provided that the object fixing device is supported on the base body so that it can pivot between the end positions along a section of a circular path.

For realizing the ability of the object fixing device to pivot relative to the base body of the scanning object carrier, various embodiments are conceivable. For example, it would be possible that the base body has a correspondingly curved rail, connecting link, or the like, along which the object fixing device can be moved for performing the pivoting motion. Especially preferred variants of the invention, however, provide that the object fixing device is fixed on a pivot arm of the scanning object carrier and the pivot arm is held on the base body so that it can pivot about an object carrier pivot axis.

To support the pivoting of the object fixing device between the end positions under the effect of the force of gravity, preferred variants of the invention with a pivot arm provide that the object fixing device is fixed on the pivot arm at a distance from the object carrier pivot axis and a counterweight is arranged on the pivot arm on a side of the pivot arm opposite the object fixing device, viewed with respect to the object carrier pivot axis. In other words, in these variants, there is a counterweight on the pivot arm on the side opposite the object fixing device with respect to the object carrier pivot axis. Through corresponding selection of the distances from the object carrier pivot axis and the masses of the object fixing device together with the object to be scanned on one hand and the counterweight on the other hand, the torques acting against each other can be set so that, for corresponding pivoting of the base body of the scanning object carrier, the force of gravity provides for the object fixing device to move correspondingly, together with the object to be scanned, into the other desired end position. Alternatively, it is also possible to arrange the object fixing device on the object carrier pivot axis. In these cases, it is then preferably provided to arrange a counterweight eccentrically with respect to and/or at a distance from the object carrier pivot axis. The counterweight and the object fixing device are then preferably connected to each other, e.g., by a pivot arm, and jointly supported on the base body so that it can pivot about the object carrier pivot axis. Finally, the center of gravity of the entire assembly of the masses supported pivotably on the base body should be eccentric to the object carrier pivot axis, that is, in other words, should not lie on the object carrier pivot axis.

The pivot angle about which the object fixing device can be pivoted between the end positions as supported on the base body is preferably an angle in the range from 75° to 105°, advantageously from 85° to 95°. In an especially preferred way, this pivot angle between the end positions is 90°.

BRIEF DESCRIPTION OF THE DRAWINGS

Additional features and details of preferred variants of the invention will be explained below with reference to the accompanying figures. Shown are:

FIGS. 7 and 8, the two end positions in which the scanning process is performed with the arrangement according to FIG. 6, each in a view in a direction parallel to the object carrier pivot axis.

DETAILED DESCRIPTION

Figure 1:
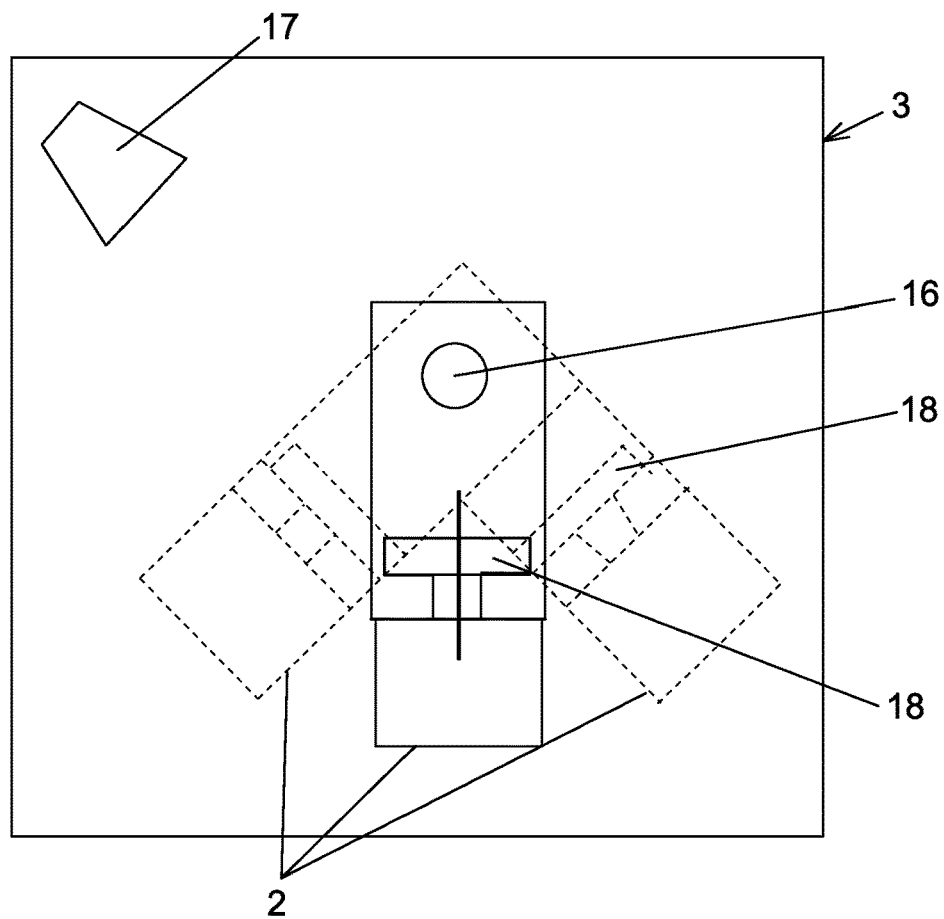
FIGS. 1 and 2, a greatly schematized representation of a known scanning device from the prior art, FIGS. 3 to 5, schematized representations of an embodiment of a scanning object carrier according to the invention, FIG. 6, a schematized side view of an arrangement with a scanning device according to FIGS. 1 and 2 and with a scanning object carrier according to FIGS. 3 to 5.
Figure 2:
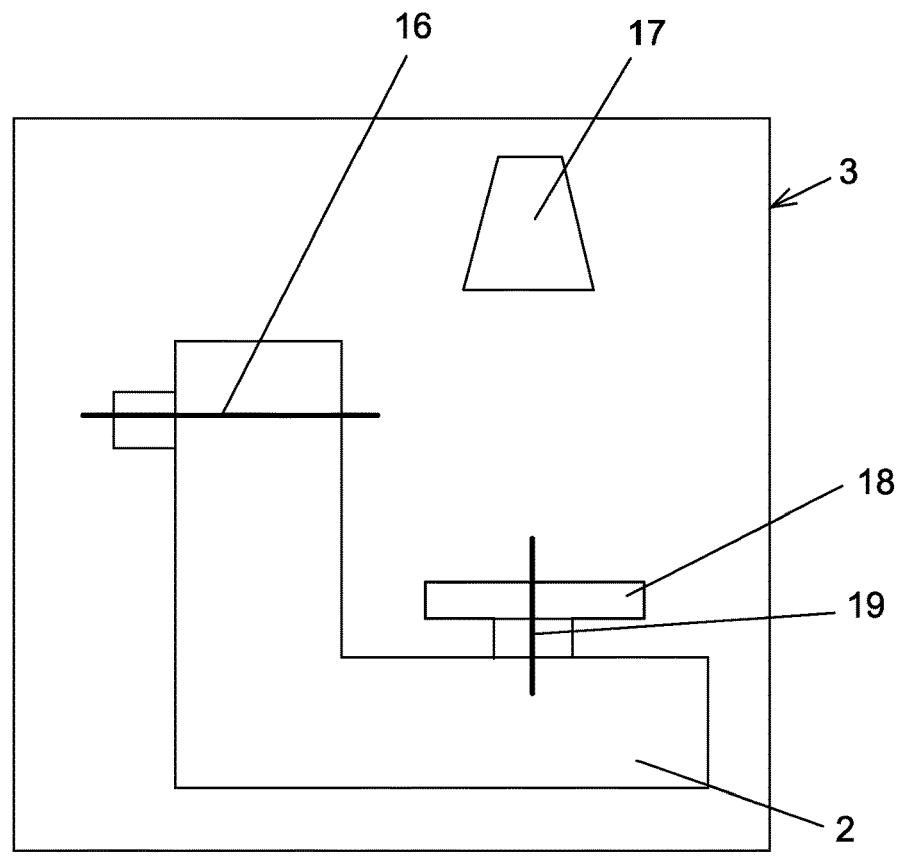

FIGS. 1 and 2 show, in a greatly schematized representation, a known scanning device 3 from the prior art for scanning a, in particular, dental, object 20. In an optionally present housing shown here only with a box-like shape, for such scanning devices 3, there is usually a hollow space in which a scanner rocker 2 is supported so that it can pivot about its rocker pivot axis 16. The drive required for the pivoting motion is not shown separately here. For the actual scanning process, at least one scanner head 17 is provided. This is the detector that scans or, in other words, samples or measures the object 20 to be scanned. The object 20 to be scanned, which is not shown in FIGS. 1 and 2, can be supported on the scanner rocker 2 either directly on the plate 18 or according to the invention with a scanning object carrier 1 according to the invention explained farther below. In FIG. 1, a view is shown from the direction parallel to the rocker pivot axis 16.

The scanner rocker 2 is shown in FIG. 1 in a vertically downward hanging position drawn with solid lines and two positions pivoted from this hanging position, drawn with dotted lines. FIG. 2 shows a side view from a direction orthogonal to the rocker pivot axis 16. In the shown variant, the plate 18 is supported on the scanner rocker 2 so that it can rotate about a rotational axis 19. The latter, however, is not absolutely necessary. Openings for inserting the object 20 to be scanned into the optionally present housing of the scanning device 3 and the like are omitted here in this greatly simplified, schematic representation, but other known features corresponding to scanning device 3, like in the prior art, can also be constructed.

In FIGS. 3, 4, and 5, for example, a schematized scanning object carrier 1 formed according to the invention is shown. FIG. 3 shows a view from the direction parallel to the object carrier pivot axis 13. FIG. 4 shows a side view from a direction orthogonal to the object carrier pivot axis 13. FIG. 5 shows a view such as FIG. 3, wherein here, however, both end positions of the object fixing device 6 are shown. The scanning object carrier 1 of this embodiment has a base body 4, a fastening device 5, and an object fixing device 6. The fastening device 5 is used for fastening the scanning object carrier 1 on the plate 18 and thus on the scanner rocker 2. The fastening device 5 can have very different constructions, as already explained above.

The object fixing device 6 is used for fixing the object 20 to be scanned on the scanning object carrier 1. It can also have a different construction than those already explained above.

The object fixing device 6 is supported so that it can pivot relative to the base body 4 between the end positions 7 and 8. In the preferred embodiment shown here, the base body 4 has two end stops 9 and 10, which limit the pivoting motion of the object fixing device 6 in the end positions 7 and 8. In the shown embodiment, this is realized by the contact of the pivot arm 12 on one of the two end stops 9 or 10. In FIG. 5, the first of the end positions 7 is shown with solid lines and the second of the end positions 8 is shown with dotted lines.

In the illustrated embodiment, the ability of the object fixing device 6 to pivot and thus also the object 20 to be scanned relative to the base body 4 of the scanning object carrier 1 is realized by a pivot arm 12. The object fixing device 6 is fixed on this pivot arm 12. The pivot arm 12 is held on the base body 4 so that it can pivot about the object carrier pivot axis 13. The object fixing device 6 is here fixed on the pivot arm 12 at a distance from the object carrier pivot axis 13. A counterweight 14 is arranged on the pivot arm 12 on the opposite side. The object fixing device 6 and the counterweight 14 are located on mutually opposing sides of the pivot arm 12 with respect to the object carrier pivot axis 3. Through this arrangement, in this embodiment it is achieved that the object fixing device 6 is supported on the base body 4 so that it can pivot together with the object 20 to be scanned and fixed on the fixing device along a section 11 of a circular path between the end positions 7 and 8. The section 11 of the circular path is drawn with dotted lines in FIG. 5.

In the embodiment shown here, the pivot angle 15, about which the object fixing device 6 can pivot between its end positions 7 and 8, being supported on the base body, is 90°. Other preferred ranges for the pivot angle 15 are specified above.

According to the invention, the construction of the scanning object carrier 1 shown here as an embodiment has no separate drive mechanism for pivoting the object fixing device 6 relative to the base body 4. Instead, it is provided according to the invention that the object fixing device 6 is supported on the base body 4 so that it can pivot between the end positions 7 and 8 freely following the force of gravity.

Generally speaking, the pivoting of the object fixing device 6 relative to the base body 4 can be produced by the force of gravity such that the scanning object carrier 1 is pivoted as a whole assembly. This is preferably created by a pivoting of the scanner rocker 2 together with a scanning object carrier 1 mounted on the rocker.

Figure 6:
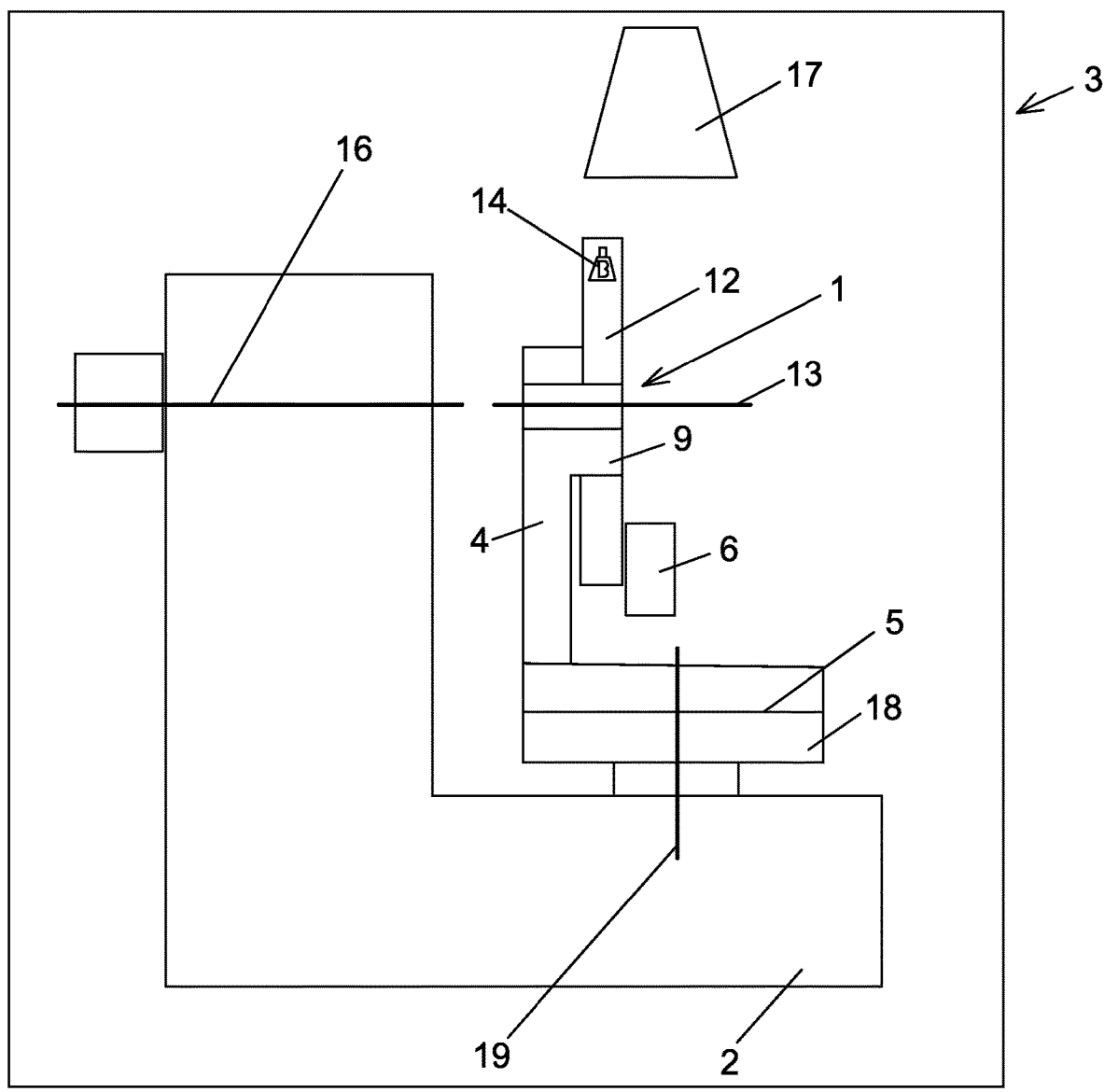

To further explain this, reference will be made to FIGS. 6 to 8. FIG. 6 shows an arrangement according to the invention in a schematized side view from the direction orthogonal to the object carrier pivot axis 13 and also to the rocker pivot axis 16, in which the scanning object carrier 1 according to the invention is mounted on the scanner rocker 2 of the scanning device 3 by means of its fastening device 5. In FIG. 6 it is easy to see that in preferred constructions, as shown here, the rocker pivot axis 16 and the object carrier pivot axis 13 are arranged or at least can be arranged coaxial to each other.

FIGS. 7 and 8 show the arrangement according to the invention in the end positions of the object fixing device 6, in which opposing sides of the object 20 to be scanned and fixed on the object fixing device 6 can be scanned by means of the scanner head 17. FIGS. 7 and 8 each show views in the direction parallel to the object carrier pivot axis 13 and to the rocker pivot axis 16.

In FIG. 7, the object fixing device 6 is in the first of its end positions 7 in which the object fixing device 6 or here, the pivot arm 12, contacts the end stop 9. This end position 7 can be created by corresponding pivoting of the scanner rocker 2 together with the scanning object carrier 1 about the rocker pivot axis 16. The force of gravity applied to the object fixing device 6 and the object 20 on one side and on the counterweight 14 on the other side provides for a corresponding free pivoting into the end position 7 shown in FIG. 7. In this position, for the method according to the invention, a first scanning process is now performed by the scanner head 7. Then the object fixing device 6 is pivoted with the object 20 fixed on this fixing device only by the pivoting of the scanner rocker 2 and by the corresponding effect of the force of gravity into the second of its end positions 8. This position created in this way is shown in FIG. 8, in which the object fixing device 6 is located in the second of its end positions 8. If this position according to FIG. 8 is reached, the second side of the object 20 can be scanned in a second scanning process by the scanner head 17.

The comparison of FIGS. 7 and 8 shows that, as an example, through the ability of the object fixing device 6 to freely pivot according to the invention relative to the base body 4 of the scanning object carrier 1, a separate drive mechanism in the scanning object carrier 1 can be completely eliminated. The pivoting of the object fixing device 6 together with the object 20 to be scanned is realized exclusively through a pivoting of the entire scanning object carrier 1 by the scanner rocker 2 and a corresponding effect of the force of gravity. The force of gravity here provides a certain pivot angle of the scanner rocker 2 for pivoting the object fixing device 6 together with the object 20 fastened to this fixing device from one of its end positions 7 or 8 into the other end position 7 or 8.

LEGEND FOR THE REFERENCE SYMBOLS

1 Scanning object carrier
2 Scanner rocker
3 Scanning device
4 Base body
5 Fastening device
6 Object fixing device
7 First of the end positions
8 Second of the end positions 9 End stop
10 End stop
11 Section of a circular path
12 Pivot arm
13 Object carrier pivot axis
14 Counterweight
15 Pivot angle
16 Rocker pivot axis
17 Scanner head
18 Plate
19 Rotational axis
20 Object

The invention claimed is:

1. A scanning object carrier provided for assembly on a scanner rocker of a scanning device configured for scanning at least one object, the scanning object carrier comprising:
a base body,
a fastening device configured to fasten the base body on the scanner rocker,
an object fixing device configured to affix the object on the scanning object carrier, the object fixing device is supported on the base body for pivoting movement relative to the base body, and
the object fixing device is pivotally supported on the base body for movement between two end positions freely following a force of gravity.

2. The scanning object carrier according to claim 1, wherein the base body further comprises two end stops configured to limit a pivoting motion of the object fixing device in the end positions.

3. The scanning object carrier according to claim 1, wherein the object fixing device is supported on the base body for pivoting movement between the end positions along a section of a circular path.

4. The scanning object carrier according to claim 1, further comprising a pivot arm, the object fixing device is fixed on the pivot arm, and the pivot arm is held on the base body for pivoting movement about an object carrier pivot axis.

5. The scanning object carrier according to claim 4, wherein the object fixing device is fixed on the pivot arm at a distance from an object carrier pivot axis and a counterweight is arranged on the pivot arm on a side of the pivot arm opposite the object fixing device, as seen with respect to the object carrier pivot axis.

6. The scanning object carrier according to claim 1, wherein the object fixing device is supported on the base body for pivoting movement between the end positions by a pivot angle in a range from 75° to 105°.

7. An arrangement comprising a scanning device configured for scanning at least one object and a scanning object carrier according to claim 1 that is mounted on the scanner rocker of the scanning device.

8. The arrangement according to claim 7, wherein the scanner rocker is pivotable about a rocker pivot axis of the scanning device and the object fixing device is held on the base body of the scanning object carrier for pivoting movement about an object carrier pivot axis, and the rocker pivot axis and the object carrier pivot axis are aligned coaxial to each other.

9. A method for scanning at least one object, comprising fixing the object on an object fixing device of the scanning object carrier according to claim 1, fixing the base body of the scanning object carrier using the fastening device on the scanner rocker of the scanning device, then scanning a first side of the object in a first scanning process, wherein the object fixing device is located in a first of the two end positions during the first scanning process, and then pivoting the object fixing device with the object fixed therein exclusively by the pivoting of the scanner rocker and by the effect of gravity into a second of the end positions, and then scanning a second side of the object in a second scanning process, wherein the object fixing device is located in the second of the end positions during the second scanning process.

10. The method according to claim 9, wherein the first scanning process and the second scanning process are performed with a same scanner head of the scanning device, and the scanner head is arranged fixed in place in the scanning device.

11. The method of claim 9, wherein the first side of the object and the second side of the object are opposite sides of the object.

* * * * *